(12) United States Patent
Fetzer et al.

(10) Patent No.: US 10,933,740 B2
(45) Date of Patent: Mar. 2, 2021

(54) FUEL TANK WITH BAFFLES AND STRUTS

(71) Applicant: MAGNA STEYR fuel Systems Gmbh Werk Schwäbisch Gmünd, Schwäbisch Gmünd (DE)

(72) Inventors: Horst Fetzer, Eislingen (DE); Steffen Zanek, Schwäbisch Gmünd (DE)

(73) Assignee: MAGNA STEYR Fuel Systems GmbH Werk Schwäbisch Gmünd, Schwäbisch Gmünd (DE)

( * ) Notice: Subject to any disclaimer, the term of this patent is extended or adjusted under 35 U.S.C. 154(b) by 0 days.

(21) Appl. No.: 15/942,626

(22) Filed: Apr. 2, 2018

(65) Prior Publication Data
US 2018/0312056 A1 Nov. 1, 2018

(30) Foreign Application Priority Data

Apr. 26, 2017 (DE) .......................... 102017207057.9

(51) Int. Cl.
| | |
|---|---|
| *B60K 15/03* | (2006.01) |
| *B60K 15/073* | (2006.01) |
| *B60K 15/067* | (2006.01) |
| *B60K 15/077* | (2006.01) |

(52) U.S. Cl.
CPC ...... *B60K 15/073* (2013.01); *B60K 15/03006* (2013.01); *B60K 15/03177* (2013.01); *B60K 15/067* (2013.01); *B60K 15/077* (2013.01); *B60K 2015/0344* (2013.01); *B60K 2015/03453* (2013.01); *B60K 2015/03493* (2013.01); *B60K 2015/0775* (2013.01); *B60K 2015/0777* (2013.01); *B60Y 2200/14* (2013.01); *B60Y 2200/141* (2013.01); *B60Y 2200/142* (2013.01)

(58) Field of Classification Search
CPC .. B60K 15/073; B60K 15/067; B60K 15/077; B60K 2015/0777; B60K 2015/0344; B60K 2015/0775; B60K 15/03006
USPC ................................ 220/563, 652, 653, 651
See application file for complete search history.

(56) References Cited

U.S. PATENT DOCUMENTS

| | | |
|---|---|---|
| 5,848,720 A | 12/1998 | Logan |
| 6,691,889 B1 | 2/2004 | Falk |
| 7,963,272 B2 * | 6/2011 | Kleinberger ........ F02D 19/0668 123/557 |

FOREIGN PATENT DOCUMENTS

| | | |
|---|---|---|
| DE | 271499 A1 | 9/1989 |
| DE | 102004046914 A1 | 3/2006 |
| DE | 102005050801 A1 | 4/2007 |
| DE | 102006021710 A1 | 11/2007 |
| DE | 102008027291 A1 | 12/2009 |
| EP | 0872372 A1 | 10/1998 |

(Continued)

OTHER PUBLICATIONS

Office Action from the China National Intellectual Property Administration (CNIPA), dated Sep. 28, 2020.

*Primary Examiner* — Stephen J Castellano
(74) *Attorney, Agent, or Firm* — Jordan IP Law, LLC; Todd A. Vaughn

(57) ABSTRACT

A fuel tank for a truck, the fuel tank having a fuel tank body with a peripheral wall and end walls that define at least one receptacle to receive a liquid or gaseous medium. At least one baffle is fixedly attached to the inside surface of the peripheral wall via an inner fixing member. An outer fixing member is to fixedly attach the fuel tank body to the chassis of the truck, and is also connected to the inner fixing member through the peripheral wall.

10 Claims, 6 Drawing Sheets

(56) References Cited

FOREIGN PATENT DOCUMENTS

| | | |
|---|---:|---|
| EP | 1187735 B1 | 9/2004 |
| EP | 2174819 A2 | 4/2010 |
| JP | 2000203281 A | 7/2000 |
| JP | 2008265532 A | 11/2008 |
| JP | 2008265532A A1 | 8/2011 |

* cited by examiner

FUEL TANK WITH BAFFLES AND STRUTS

CROSS-REFERENCE TO RELATED APPLICATIONS

The present application claims priority under 35 U.S.C. § 119 to German Patent No. DE 102017207057.9, filed on Apr. 26, 2017, which is hereby incorporated by reference in its entirety.

TECHNICAL FIELD

Embodiments relate to a fuel tank, for example, for a truck. Such a fuel tank is configured to receive fuel and comprises a fuel tank body and an attachment member configured to enable attachment of the fuel tank body to a chassis side member of the truck.

BACKGROUND

In fuel tanks for trucks, the outer shell is composed of a peripheral wall which is terminated on end faces thereof by end walls. Usually the peripheral wall is formed tubular, wherein the end walls are welded onto the two open ends. Fuel tanks, however, are also known which are composed of one or more sleeve-like parts, in which at least one part of the peripheral wall is integral with the end wall.

It is also known that one or more intermediate walls are arranged inside the peripheral wall, for example in the form of baffles or in the form of partitions for subdividing the fuel tank.

Fuel tanks for trucks are normally made of stainless steel, steel, aluminum or corresponding alloys. It is also possible to make the peripheral wall and intermediate walls from different materials, for example the intermediate walls of plastic and the peripheral wall of metal. Fuel tanks are also known in which the outer shell is formed completely from plastic.

Irrespective of the method of production of the fuel tank, fixing of the fuel tank to the truck takes place via a plurality of external fixing elements. In order to mount the fuel tank on the chassis side member of the truck, tanks supports are installed which are L-shaped brackets connected together via a longitudinal strut. The fuel tank is placed in this tank support via rubber mounts. The fuel tank is attached via clamping straps which are secured to the tank support by bolts. The tank support itself is bolted to the chassis side member of the truck via bolted intermediate pieces.

German Patent Publication No. DE 102009019193A1 discloses a container for receiving fuel, wherein the container comprises a variable number of tank units connected together via wall elements. Each wall element has a wall region and a supporting element, wherein the tank can be attached to the vehicle by means of the supporting element, and the supporting element and wall region are formed as a moulding. However, these wall elements are visible from the outside, and the individual tank elements must be sealed against each other and against the wall elements.

FIGS. 1 and 2 illustrate a conventional fuel tank 1 for trucks, and comprises a peripheral wall 2 forming a receptacle 3. The peripheral wall 2 is composed of metal, more precisely, aluminum. A configuration with another metal material or plastic material is also possible. A design of the fuel tank 1 as a large capacity fuel tank is provided, the peripheral wall 2 of which forms a receptacle 3 having a capacity of 300 to 1600 litres, preferably 500 to 1000 litres.

The tubular peripheral wall 2 has two end faces, wherein the two end faces are closed in the known fashion via an end wall 4.

A plastic container is connected to the end face of the peripheral wall 2 or joined to the peripheral wall 2, and a baffle 15 is arranged in the peripheral wall 2. The peripheral wall 2 may be arranged or clamped onto a bracket 8 of a truck, depicted only via the attachments. The bracket 8 may be formed in the known fashion. The bracket 8 has three bracket elements 9, each of which substantially form a horizontal and a vertical support face. To clamp the fuel tank 1 to the bracket elements 9, corresponding clamping straps 10 are provided. A filler neck 12 serves for filling of the fuel tank.

SUMMARY

Embodiments relate to a fuel tank which is improved over conventional designs, and simplifies the problem of mounting the fuel tank body on the vehicle.

In accordance with embodiments, a fuel tank for a truck may include a fuel tank body having a peripheral wall and end walls which collectively defines at least one receptacle configured to receive a liquid or gaseous medium; at least one baffle arranged inside the peripheral wall, the at least one baffle including an inner attachment member configured for attachment inside the peripheral wall and for connection to an outer attachment member through the peripheral wall.

In accordance with embodiments, the fuel tank advantageously does not require a conventional fuel tank support having individual attachment members, rubber mounts, and clamping straps. This makes mounting of the fuel tank body on the vehicle less complex. The overall weight of the fuel tank is reduced by the omission of the conventional components.

It is advantageous if the baffle has inner fixing member(s) in the form of lugs. The baffle already present in the fuel tank has a double function of preventing sloshing movements of the fuel and to fixedly attach the fuel tank body to the truck. For this, additional mechanical attachments in the form of lugs may be provided on the baffle, or the outer periphery of the baffles serves as a fixing member(s).

Advantageously, the inner fixing member and the outer fixing member are arranged above a centre line of the fuel tank. By the omission of all fixing components previously used in the prior art, and by the arrangement of the fixing means and outer fixing means, installation space is cleared below the chassis side member of the truck.

It is advantageous if the baffles are connected together via longitudinal struts, which increases the stability of the tank.

It is advantageous if the longitudinal struts predefine either an equal or different distances between the baffles, and the respective fuel tank can be configured flexibly.

For further reinforcement of the baffles, it is advantageous if the baffles have reinforcing struts on their surfaces.

The solution according to the invention may be used if the fuel tank is made of aluminum, steel, special steel or plastic. There are no restrictions on the material for implementing the fixing solution according to the invention.

In one exemplary embodiment, the fixing means comprises bolting or riveting to at least one baffle and to a chassis side member on the truck.

Alternatively, the fixing means is a dovetail guide which can be inserted in a corresponding receiver on the chassis side member of the truck.

DRAWINGS

DESCRIPTION

FIGS. 3-6 illustrate a technical solution in accordance with embodiments.

Figure 1:
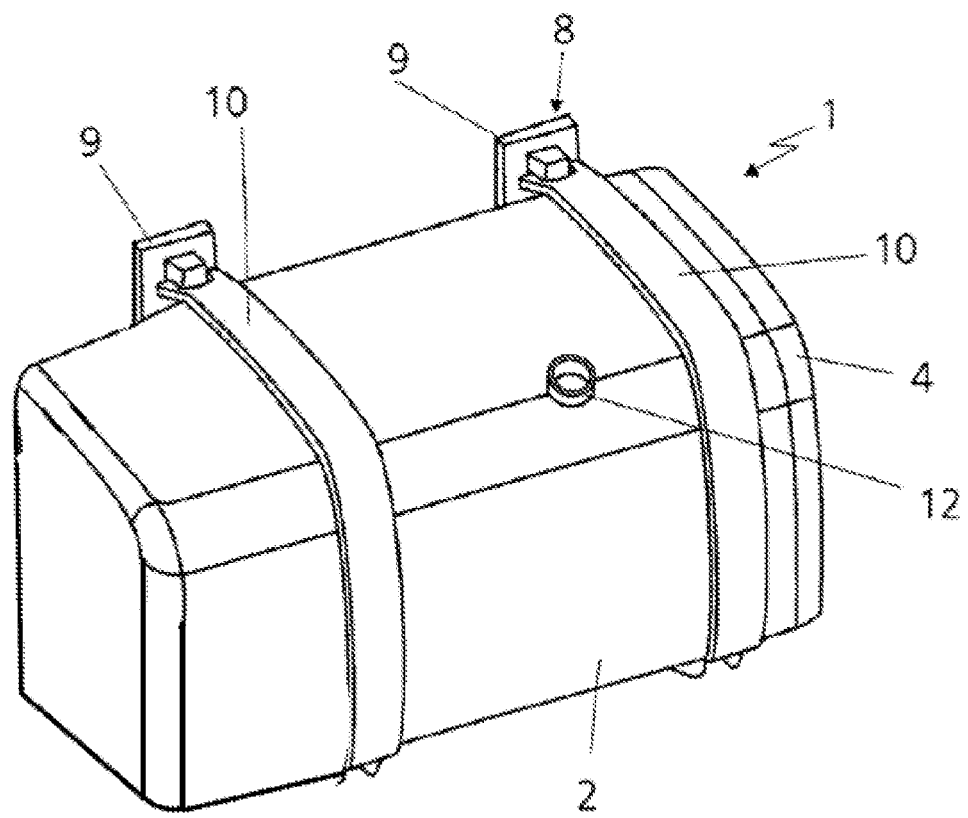
FIG. 1 illustrates a perspective view of a conventional fuel tank.
Figure 2:
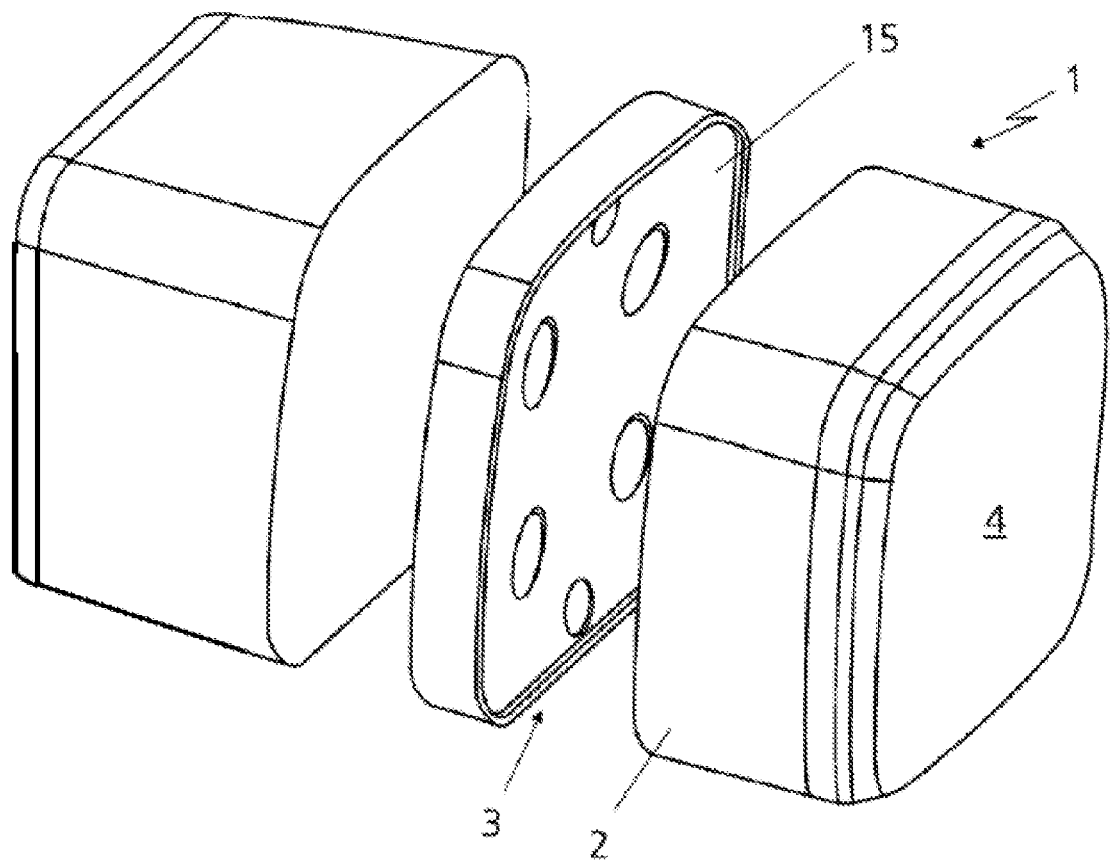
FIG. 2 illustrates a side view of a conventional fuel tank.
Figure 3:
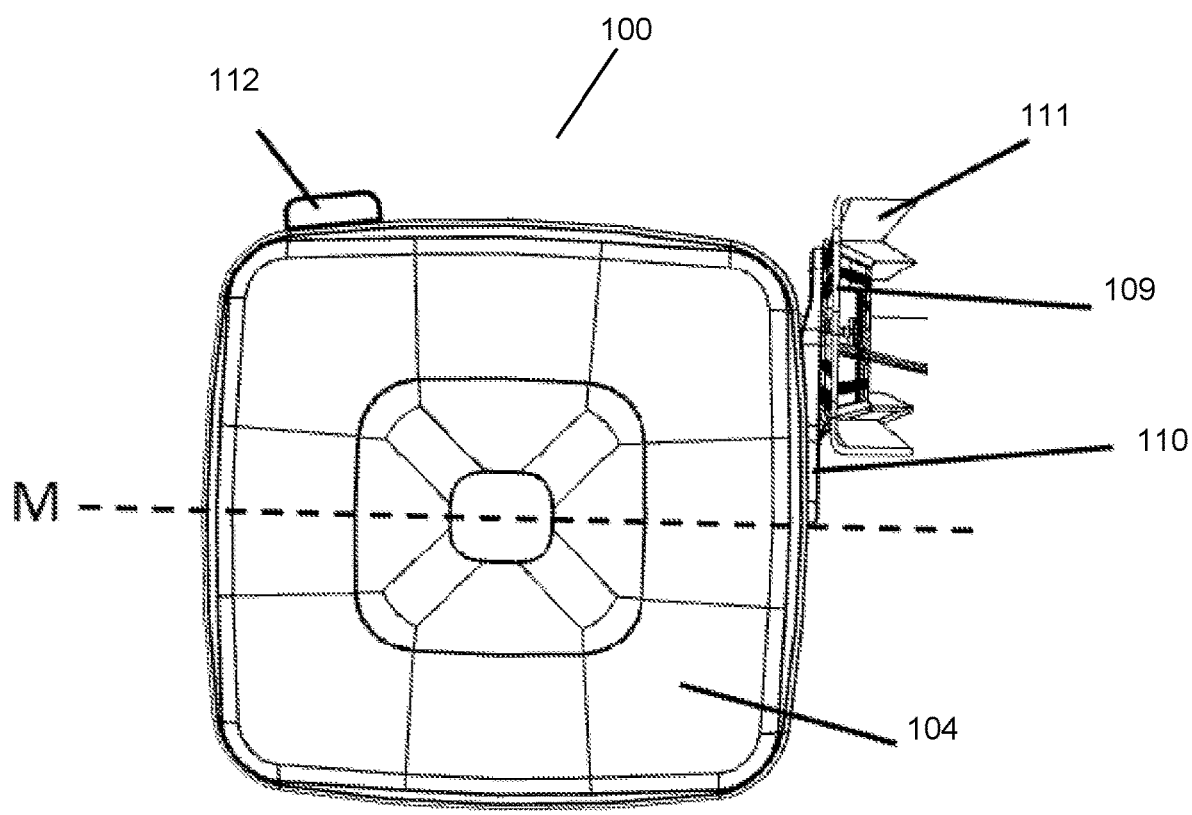
FIG. 3 illustrates a front view of the fuel tank, in accordance with embodiments.

As illustrated in FIG. 3, a fuel tank 100 includes an end wall 104. Spatially above a theoretical centre line M of the end wall 4, a fixing member 110 is arranged on a corresponding bracket element 109 of the truck. The chassis side member 11 of the vehicle is merely indicated.

Figure 4:
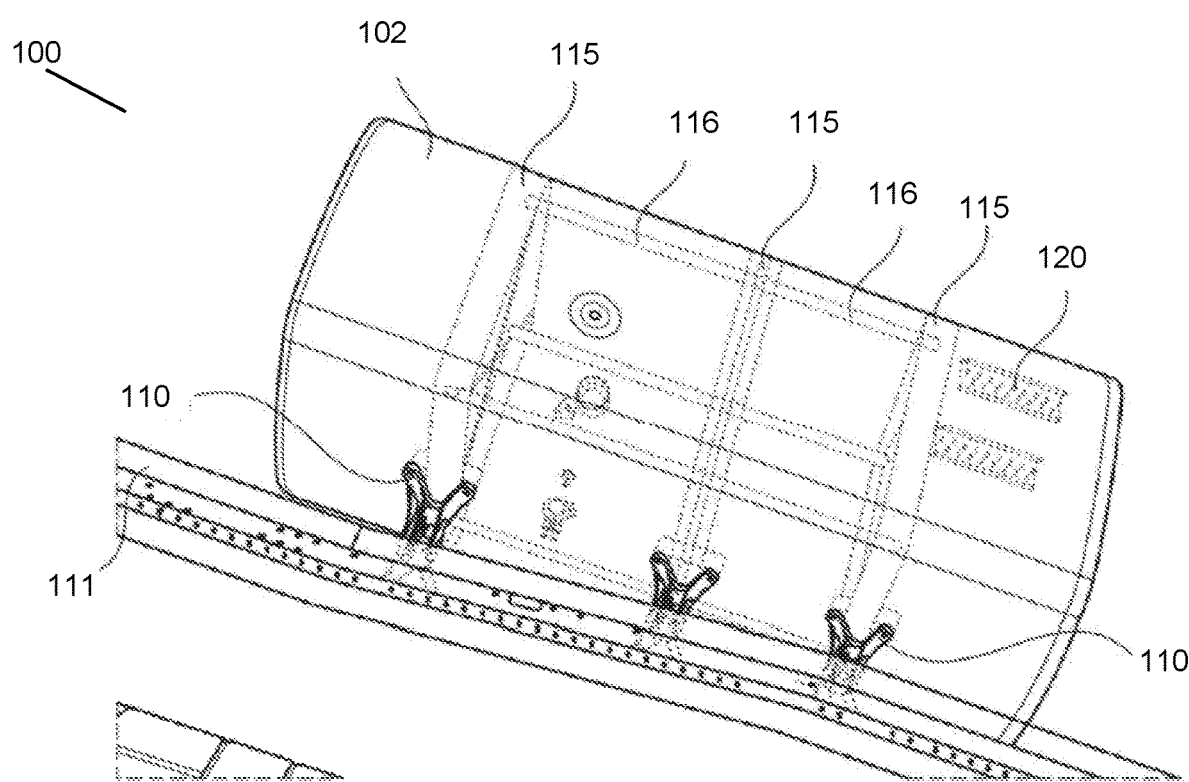
FIG. 4 illustrates a transparent side view of the fuel tank of FIG. 3.

As illustrated in FIG. 4, steps 120 are arranged on the fuel tank 100. The peripheral wall 102 gives a clear view of the baffles 115 arranged inside the tank, i.e., inside the peripheral wall 102. The baffles 115 are connected to each other via a plurality of longitudinal struts 116. The longitudinal struts 116 have the form of bars which extend along the longitudinal axis of the fuel tank 100, and are arranged adjacent to the peripheral wall 102. In accordance with embodiments, four or more longitudinal struts 116 may be used and arranged at the corners of the respective, baffles 115. These are continuous longitudinal struts 115 which are configured to penetrate the center baffle 115 and terminate at the two outer baffles 115. Alternatively, the longitudinal struts 116 are present as longitudinal strut portions which each connect together only two baffles 115. The length of the longitudinal struts 116, and hence, the spacing of the baffles 115 is selected optimally for the respective fuel tank 100. The baffles 115 may be provided with the same spacing from each other or with different spacing from each other.

Figure 5:
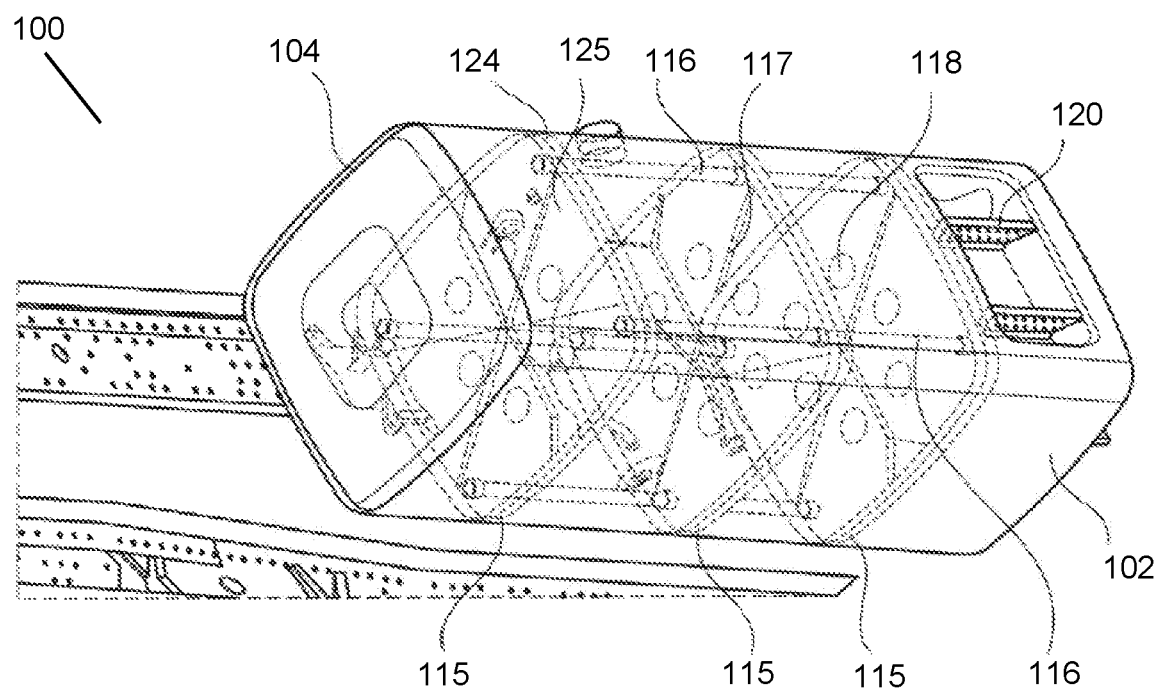
FIG. 5 illustrates a top view of the fuel tank of FIG. 3.

As illustrated in FIG. 5, each baffle 115 have a plurality of openings 118 extending completely through the outer surface 125, and through which fuel is permitted to flow inside the fuel tank 100. To further reinforce the baffles 115, secondary struts 117 are provided on the surfaces 125 of the baffles 115. Each secondary strut 117 is configured to extend diagonally (e.g., in a star shape) across the outer surface 125 of each corresponding baffle 115. The reinforcements of the baffles 115 are produced to ensure optimal stiffening and maintain the structural integrity of the fuel tank 100. Embodiments are not limited thereto, however, and may include framework struts or linear arrangements that permit practice of embodiments.

Figure 6:
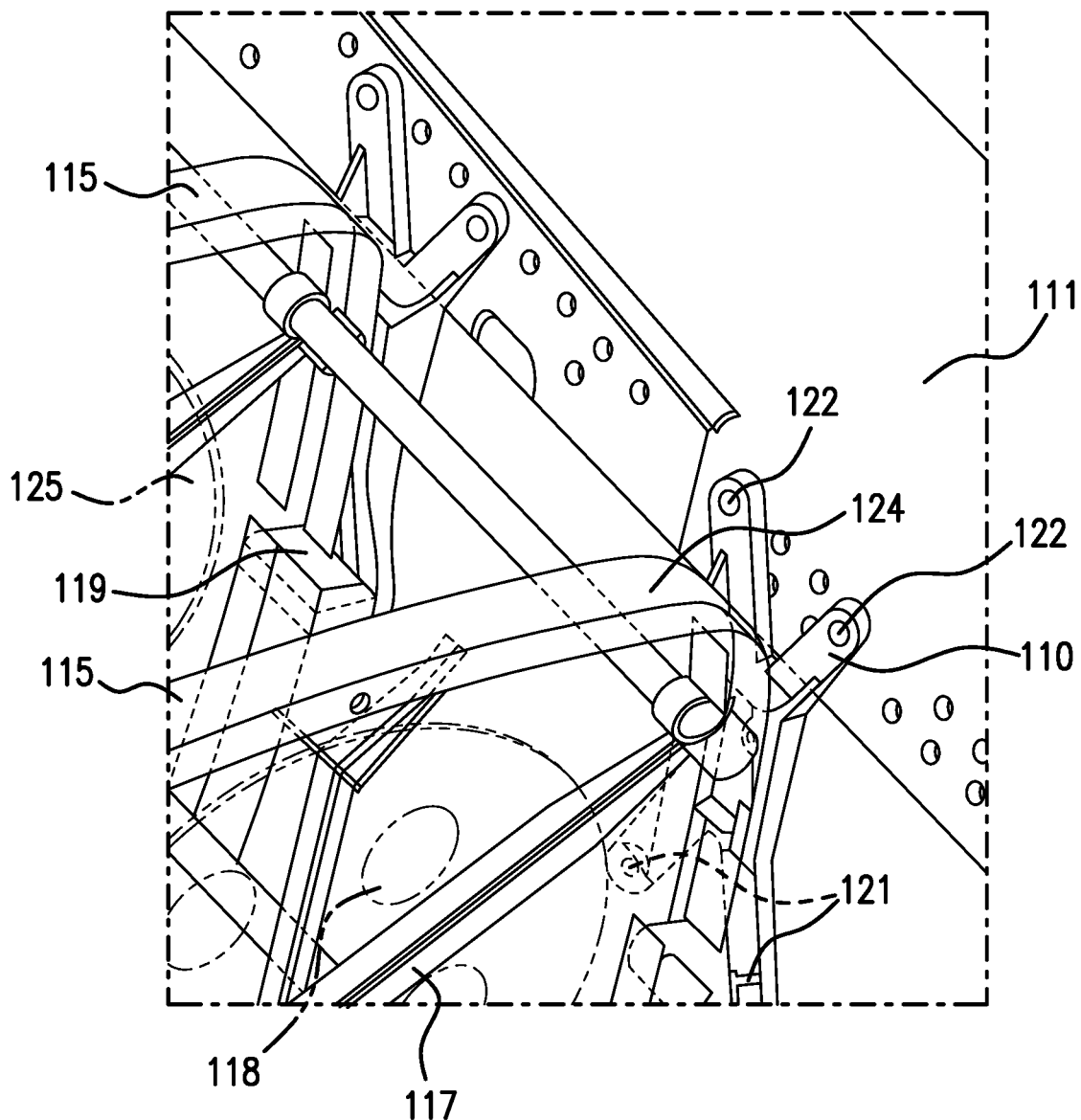
FIG. 6 illustrates the attachment members of the fuel tank of FIG. 3.

As illustrated in FIG. 6, the baffles 115 also comprise attachment members in the form of lugs 119 which extend vertically from the surface 125 of a corresponding baffle 115 parallel to the peripheral wall 102. Each lug 119 is configured to connect a corresponding baffle 115 to the inside surface of the peripheral wall 102. The lugs 119 are arranged on the baffles 115, preferably integrally, above a theoretical centre line M of the fuel tank 100. The outer peripheral sidewalls 124 of the baffle 115 may also serve as an attachment member for connecting the baffles 115 to the inside surface of the peripheral wall 102.

FIG. 6 further illustrates outer fixing members 110 that are arranged, for example, in an X-shape. Screw holes 121, 122 are provided at the ends of the fingers of the fixing members 110. The first screw holes 121 serve to mechanically fix, via the lugs 119, the fuel tank 100 to the fixing members 110. The second screw holes 122 serve to mechanically fix the fuel tank 100 via bolts, screws or the like to the chassis side member 111 of the vehicle. The peripheral wall 102 is perforated only at the screw hole and may easily be sealed via corresponding bolts, screws or the like. Alternative fixing methods are also conceivable. The baffles 115 themselves may also serve as connections for the external fixing members 110. The widening created by the lugs 119 is therefore not always necessary. The proposed fixing members 110 is merely one example and many different types of fixings are conceivable. The important factor is only that the fixing takes place above the theoretical centre line M of the fuel tank. A further example is possible with the use of a dovetail guide, wherein a receiver is attached to the truck and the fuel tank according to the invention need merely be inserted via a dovetail guide.

The fuel tank 100 may also comprise many different receptacles, such as, for example, a receptacle for urea in addition to the diesel receptacle.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SYMBOLS

1 Fuel tank
2 Peripheral wall
3 Receptacle
4 End wall
8 Bracket
9 Bracket element
10 Clamping straps
11 Chassis side member
12 Filler neck
15 Baffle
100 Fuel tank
102 Peripheral wall
104 End wall
108 Bracket
109 Bracket element
110 Fixing member (Outer)
111 Chassis side member
112 Filler neck
115 Baffle
116 Longitudinal strut
117 Secondary Strut 118 Opening
119 Lugs
120 Step
121 Screw holes
122 Screw holes
124 Outer peripheral sidewall of baffle
125 Outer surface of baffle
M Centre line.

What is claimed is:

1. A fuel tank for a vehicle, the fuel tank comprising:
a fuel tank body having a peripheral fuel tank wall and fuel tank end walls that collectively define at least one fuel tank receptacle to receive a liquid or gaseous medium;
a plurality of baffles arranged spaced apart in the at least one fuel tank receptacle, the baffles including outer baffles and a center baffle arranged between the outer baffles, each baffle in the plurality of baffles having an inner fixing member in a form of a lug arranged spatially above a center line of the fuel tank end walls to connect the baffle at the inside surface of the peripheral fuel tank wall;
an outer fixing member, arranged spatially above the center line of the end walls on a corresponding bracket element of the vehicle, to connect to the lug through the peripheral fuel tank wall and also fixedly attach the fuel tank body to the vehicle; and
a plurality of reinforcement struts, extending along the longitudinal axis of the fuel tank adjacent to the peripheral wall to penetrate the center baffle and terminate at the outer baffles, to connect the baffles to each other; and
a plurality of secondary reinforcement struts, arranged to extend diagonally across an outer sidewall surface of a corresponding one of the baffles and reinforce the corresponding baffle in the at least one fuel tank receptacle.

2. The fuel tank of claim 1, wherein the outer fixing member comprises an X-shaped cross-section that includes:
upper fingers spaced-apart from each other, each upper finger having a hole at an end thereof to permit fixing of the fuel tank to a chassis of the vehicle; and
lower fingers spaced-apart from each other, each lower finger having a hole at an end thereof to permit fixing of the fuel tank, via the lug, to the baffle.

3. The fuel tank of claim 1, wherein the outer fixing member comprises upper fingers having holes at an end thereof to fix the fuel tank, via a corresponding mechanical fastener, to a chassis side member of the vehicle.

4. The fuel tank of claim 1, wherein the outer fixing member comprises an X-shaped cross-section that includes lower fingers having holes at an end thereof to fix the fuel tank, via the lug, to the baffle.

5. The fuel tank of claim 1, wherein the outer fixing member and the inner fixing member are to fix the corresponding baffle to the fuel tank body above the center line, and also thereby fix the fuel tank to a chassis of the vehicle above the center line.

6. The fuel tank of claim 1, wherein the struts define the spacing between the baffles.

7. A fuel tank for a truck, the fuel tank comprising:
a fuel tank body having a peripheral fuel tank wall and fuel tank end walls that collectively define at least one fuel tank receptacle to receive a liquid or gaseous medium, the fuel tank body having baffles arranged spaced apart in least one receptacle of the tank body, the baffles including outer baffles and a center baffle arranged between the outer baffles, each baffle having an inner fixing member in a form of a lug to connect the baffle at a peripheral fuel tank wall of the fuel tank body;
an outer fixing member, arranged spatially above the center line of the fuel tank end walls on a corresponding bracket element of the vehicle, the outer fixing member having an X-shaped cross-section that includes including upper fingers spaced-apart from each other, each upper finger having a hole at an end thereof to permit fixing of the fuel tank to a chassis of the vehicle, and lower fingers spaced-apart from each other, each lower finger having a hole at an end thereof to permit fixing of the fuel tank, via the lug, to the baffle through the peripheral fuel tank wall;
a plurality of reinforcement struts, extending along the longitudinal axis of the fuel tank adjacent to the peripheral wall to penetrate the center baffle and terminate at the outer baffles, to connect the baffles to each other; and
a plurality of secondary reinforcement struts, arranged to extend diagonally across an outer sidewall surface of a corresponding one of the baffles and reinforce the corresponding baffle in the at least one fuel tank receptacle.

8. The fuel tank of claim 7, wherein the outer fixing member and the inner fixing member are to fix the fuel tank to the chassis of the vehicle above the center line.

9. A fuel tank for a vehicle, the fuel tank comprising:
a fuel tank body having a peripheral fuel tank wall and fuel tank end walls that collectively define at least one fuel tank receptacle to receive a liquid or gaseous medium;
a plurality of baffles arranged spaced apart in the at least one fuel tank receptacle, the baffles including outer baffles and a center baffle arranged between the outer baffles, each baffle in the plurality of baffles having an inner fixing member in a form of a lug arranged spatially above a center line of the fuel tank end walls to connect the baffle at the peripheral fuel tank wall;
an outer fixing member, arranged spatially above the center line of the fuel tank end walls on a corresponding bracket element of the vehicle, the outer fixing member having an X-shaped cross-section that includes upper fingers spaced-apart from each other, each upper finger having a hole at an end thereof to permit fixing of the fuel tank to a chassis of the vehicle, and lower fingers spaced-apart from each other, each lower finger having a hole at an end thereof to permit fixing of the fuel tank, via the lug, to the baffle;
a plurality of reinforcement struts, extending along the longitudinal axis of the fuel tank adjacent to the peripheral wall to penetrate the center baffle and terminate at the outer baffles, to connect the baffles to each other; and
a plurality of secondary reinforcement struts, arranged to extend diagonally across an outer sidewall surface of a corresponding one of the baffles and reinforce the corresponding baffle in the at least one fuel tank receptacle.

10. The fuel tank of claim 9, wherein the outer fixing member and the inner fixing member are to fix the fuel tank to the chassis of the vehicle above the center line of the fuel tank end walls.

* * * * *